United States Patent
Meng et al.

(10) Patent No.: US 10,017,423 B2
(45) Date of Patent: Jul. 10, 2018

(54) METHOD FOR PREPARING SUPPORT OF MOLECULAR SIEVE MEMBRANE

(71) Applicant: SHANDONG GUIYUAN ADVANCED CERAMICS CO., LTD, Zibo, Shandong (CN)

(72) Inventors: Fanpeng Meng, Shandong (CN); Zhenkun Fan, Shandong (CN); Jian Zhang, Shandong (CN); Chao Zhang, Shandong (CN)

(73) Assignee: SHANDONG GUIYUAN ADVANCED CERAMICS CO., LTD, Zibo, Shandong (CN)

( * ) Notice: Subject to any disclaimer, the term of this patent is extended or adjusted under 35 U.S.C. 154(b) by 0 days.

(21) Appl. No.: 15/542,648

(22) PCT Filed: Jul. 22, 2016

(86) PCT No.: PCT/CN2016/091005
§ 371 (c)(1),
(2) Date: Jul. 10, 2017

(87) PCT Pub. No.: WO2017/107478
PCT Pub. Date: Jun. 29, 2017

(65) Prior Publication Data
US 2018/0022648 A1    Jan. 25, 2018

(30) Foreign Application Priority Data
Dec. 25, 2015  (CN) .......................... 2015 1 0991906

(51) Int. Cl.
| | |
|---|---|
| *C04B 35/195* | (2006.01) |
| *C04B 35/624* | (2006.01) |
| *C04B 35/626* | (2006.01) |
| *C04B 35/636* | (2006.01) |
| *C04B 35/64* | (2006.01) |
| *C04B 41/00* | (2006.01) |
| *C04B 41/87* | (2006.01) |
| *B01D 69/10* | (2006.01) |
| *B01D 71/02* | (2006.01) |
| *C04B 41/50* | (2006.01) |

(52) U.S. Cl.
CPC .......... *C04B 35/195* (2013.01); *B01D 69/105* (2013.01); *B01D 71/028* (2013.01); *C04B 35/624* (2013.01); *C04B 35/62655* (2013.01); *C04B 35/6365* (2013.01); *C04B 35/64* (2013.01); *C04B 41/009* (2013.01); *C04B 41/5042* (2013.01); *C04B 41/87* (2013.01); *C04B 2235/3481* (2013.01); *C04B 2235/602* (2013.01); *C04B 2235/6567* (2013.01)

(58) Field of Classification Search
CPC ................ C04B 35/195; C04B 35/624; C04B 35/62655; C04B 35/64; C04B 41/009; C04B 41/5042; C04B 41/87; B01D 69/105; B01D 71/028
See application file for complete search history.

(56) References Cited

U.S. PATENT DOCUMENTS

| | | | | |
|---|---|---|---|---|
| 4,788,046 A | * | 11/1988 | Barringer | C03C 14/004 264/661 |
| 5,259,754 A | * | 11/1993 | Dalla Betta | B01D 53/8628 431/326 |
| 5,416,055 A | * | 5/1995 | Okada | B01D 53/945 502/349 |
| 2008/0032091 A1 | * | 2/2008 | Beall | C04B 35/195 428/116 |
| 2009/0149311 A1 | * | 6/2009 | Komiyama | C04B 28/24 501/133 |

FOREIGN PATENT DOCUMENTS

JP        57119842 A    *  7/1982

* cited by examiner

*Primary Examiner* — Nathan H Empie

(57) ABSTRACT

A method for preparing a support of a molecular sieve membrane is provided and relates to a technical field of support preparation, including steps of: according to a molar ratio of magnesium, aluminum and silicon in cordierite, preparing a nanometer composite sol of magnesium, aluminum, silicon and lanthanum serving as a sintering aid through a sol-gel method, enveloping and bonding the sol on a surface of dispersed nano-sized cordierite powders, and transforming the sol into nanometer composite oxides through presintering; mixing the cordierite powders, a binder and water, forming mud, extruding the mud, forming the mud into a green body, and sintering the green body into a cordierite support; coating a layer of film on the cordierite support with an aqueous dispersant of zirconia, then sintering, and obtaining a support of a molecular sieve membrane, composited by a cordierite main support layer and a zirconia film layer.

10 Claims, 1 Drawing Sheet

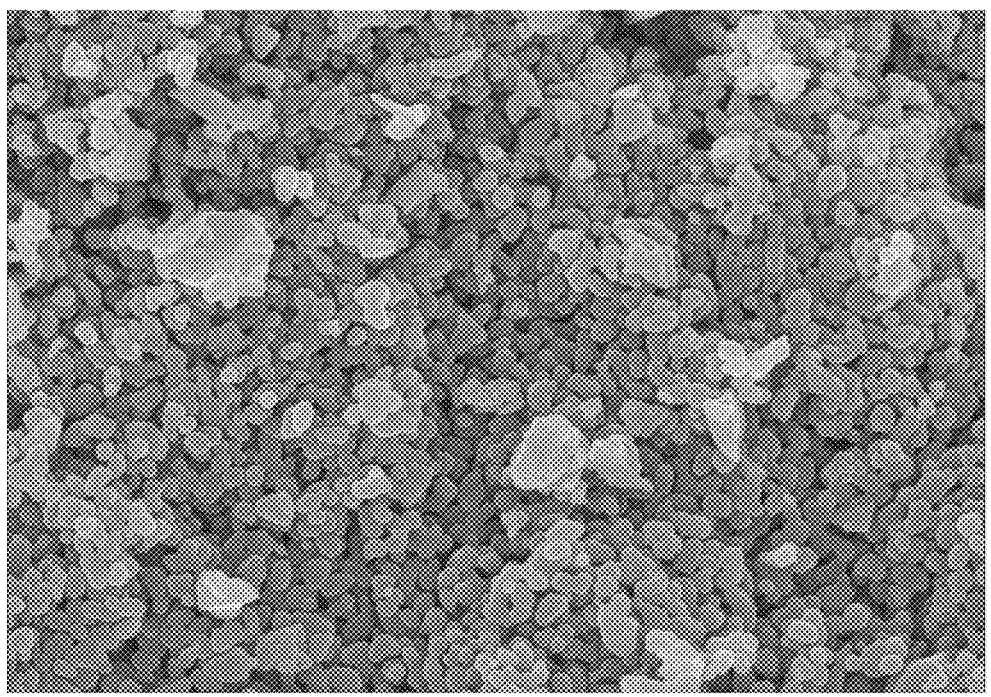

METHOD FOR PREPARING SUPPORT OF MOLECULAR SIEVE MEMBRANE

CROSS REFERENCE OF RELATED APPLICATION

This is a U.S. National Stage under 35 U.S.C 371 of the International Application PCT/CN2016/091005, filed Jul. 22, 2016, which claims priority under 35 U.S.C. 119(a-d) to CN 201510991906.9, filed Dec. 25, 2015.

BACKGROUND OF THE PRESENT INVENTION

Field of Invention

The present invention relates to a technical field of support preparation, and more particularly to a method for preparing a support of a molecular sieve membrane.

Description of Related Arts

The molecular sieve membrane is a complete and compact aluminosilicate film having the cubic lattice; and the crystal skeleton thereof has many cavities of the same size, which enable the molecules having the diameter smaller than the cavity pore channel to pass through. Thus, the molecular sieve membrane is able to accurately adsorb or separate the molecules of the different size. The molecular sieve membrane is widely applied in the separation and purification of the organic solution and the gas, for example the separation and purification of the organic acids such as acetic acid and acrylic acid, the dehydration of ethyl alcohol and propyl alcohol, the purification of oxygen in air, and the carbon dioxide removal from the various hydrocarbon products. Compared with the conventional low-temperature distillation technology requiring a large amount of energy and equipment investment, the separation and the purification with the molecular sieve membrane can save a large amount of energy and equipment investment. Because the molecular sieve membrane depends on the cavities of the lattice skeleton of the crystal thereof to separate the small gas or liquid molecules, the crystal of the molecular sieve membrane should be continuous and compact, and the defects of the crystal film, such as holes and gaps, will cause the greatly decreased separation efficiency of the molecular sieve membrane.

Conventionally, the molecular sieve membrane is formed on the support through the in-situ hydrothermal synthesis method and the secondary growth method. The in-situ hydrothermal synthesis method is to attach the agglomerated, colloidal and unformed aluminosilicate material onto the carrier, and provide the appropriate supersaturation degree under the hydrothermal synthesis conditions, so that the crystal nucleus is formed at the carrier interface and grows into the compact film. The carrier serving as the support of the molecular sieve generally has an average pore diameter of about 1 µm, while the crystal nucleus formed through the in-situ growth method is generally nano-sized. It is unavoidable that the crystal nucleus is sunk into the pore channel, causing the collapse of the molecular sieve membrane and the generation of the holes. Thus, in order to overcome the above defect, the synthesis generally has a long time or repeats several times. The secondary growth method is to firstly synthesize the dispersed molecular sieve crystal particles through the hydrothermal method, then coat the molecular sieve crystals on the carrier, and arrange the carrier in the molecular sieve synthesis mother liquid for continuing the hydrothermal synthesis, so that the dispersed molecular sieve crystals continue growing and form the compact membrane.

Conventionally, the porous support, which has a median pore diameter of about 1 µm and is made of α-aluminum oxide, stainless steel and mullite, is generally adopted as the support of the molecular sieve membrane. The Chinese patent publication, CN102861516A, disclosed a method for producing a hollow fiber support which has a pore diameter of 0.9-1.3 µm and is made of α-aluminum oxide, wherein the hollow fiber support is for serving as the support of the molecular sieve membrane. The Chinese patent publication, CN104987120A, disclosed a single-pipe or multichannel tubular support which has an average pore diameter of 0.8-1.5 µm and is made of α-aluminum oxide and mullite. For both of the above two methods, the main material is the α-aluminum oxide, the average pore diameter is basically about 1 µm, the support is single-layered, and the pore diameter distribution is difficult to be uniform. No matter the in-situ synthesis method or the secondary growth method, the crystal nucleus or the crystal seed has the nano-sized particle size and thus is difficult to be uniformly coated on the carrier having the average pore diameter of 1 µm, so that the crystal nucleus or the crystal seed is unavoidably collapsed or embedded into the pore channel, causing the inconsistent thickness and even defects of the molecular sieve membrane. Meanwhile, for the support which is made of α-aluminum oxide or stainless steel, the material price is relatively high, the sintering temperature is relatively high or the sintering atmosphere is relatively severe, and the production cost is relatively high; if the molecular sieve membrane is prepared on the above support, the production cost is further increased. Because the molecular sieve membrane has a relatively short life, the high cost will limit the industrial application thereof. The cordierite serves as a low-cost ceramic material and has been reported to be applied in preparing the porous ceramics because of the good thermal shock resistance and corrosion resistance. However, because the sintering temperature and the melting decomposition temperature of the cordierite are nearly the same, the mixed sintering methods are always adopted, such as sintering the cordierite coarse particles with a great number of sintering aids, sintering the cordierite coarse particles with the cordierite fine powders, and sintering the cordierite coarse particles with the fine particle sintering aids prepared according to the cordierite composition, so as to sinter at a temperature lower than the decomposition temperature of the aggregate cordierite particles and prepare the cordierite porous material. For the above three methods, because the sintering aids or the fine particles inevitably block the pores of the cordierite coarse particles, the pore diameter of the porous material is certainly relatively large, otherwise it is difficult to prepare the cordierite porous material having the industrial prospect. Wang Yaoming et al. prepared the cordierite support, which is for high-temperature dust removal and has a pore diameter of 128 µm, through the cordierite powders of 300 µm with the sintering aids such as the potassium feldspar (*Preparation of porous cordierite ceramic support materials for high-temperature dust gas, Journal of the Chinese Ceramic Society,* 2011, Vol. 33, No. 10, pages 1262-1265). Han Huonian et al. obtained the porous ceramic support through mixing the coarse cordierite powders of 25 µm with the fine cordierite powders of 1.5 µm, and then sintering at 1400° C. The core of the above researches is to utilize the cordierite fine powders, the sintering aids or the fine ceramic powders prepared according to the cordierite composition, which have the lower sintering temperature, to bond the cordierite coarse particles having the higher sintering temperature, so as to avoid the decomposition and fusion of the cordierite coarse particles. However, the support consists of the coarse particle aggregate inevitably has a relatively large pore diameter, generally about 10-150 μm, and is unable to serve as a support of the molecular sieve support. Meanwhile, the fine powders or the sintering aids will block the pore channel, causing the decreased porosity. If directly using the cordierite fine powders, under the sintering temperature thereof, the fine powders are inevitable to be molten and decomposed, and the obtained ceramic is compact. Thus, it is difficult to prepare the cordierite porous support of the molecular sieve, having the pore diameter of 1 μm, through directly using the cordierite of 2-5 μm.

SUMMARY OF THE PRESENT INVENTION

An object of the present invention is to provide a method for preparing a support of a molecular sieve membrane, which solves a problem that cordierite is merely able to prepare a support having a large pore diameter of larger than 5-100 μm, replaces expensive materials such as α-aluminum oxide and stainless steel by the cordierite, and decreases a cost of the support. Meanwhile, a zirconia porous film layer, which has a thickness of tens of micrometers and a pore diameter of 0.08-0.4 μm, is further coated and sintered on an outer layer of the cordierite and serves as a growth substrate of the molecular sieve membrane. The pore diameter of the zirconia porous film layer is smaller than a pore diameter of a conventional molecular sieve carrier, which avoids that molecular sieve crystal particles are sunk in large pores of the carrier.

A method for preparing a support of a molecular sieve membrane comprises steps of:

(1) adding ethyl alcohol and a first weight of water into a reaction kettle, then adding cordierite powders, and uniformly stirring; adding a first dispersant, then adding tetraethoxysilane, aluminum salt, magnesium salt and lanthanum salt, stirring and dissolving, and obtaining a mixed liquid; increasing a temperature of the mixed liquid to 65-80° C., then adding ammonium hydroxide into the mixed liquid, and adjusting a pH value thereof to 5-6; reacting for 2-12 hours, and generating a mixed sol of silicon, aluminum, magnesium and lanthanum, wherein a proportion of silicon, aluminum and magnesium in the mixed sol is the same as that in a composition of cordierite; further adjusting the pH value to 8-9, reacting for 2-6 hours, and aging the mixed sol; pouring an obtained mixture into a container, standing and generating precipitates; washing the precipitates with reverse osmosis (RO) water, sucking and filtering liquid out, and drying the precipitates; heating the dried precipitates, keeping a temperature of the precipitates, and obtaining cordierite particles enveloped by composite nanometer oxides which are prepared according to a composition proportion of the cordierite;

(2) uniformly mixing and stirring the cordierite particles, a binder, a second weight of water and a humectant, and forming mud; preparing the mud into a green body, drying the green body, and sintering the green body into a cordierite support; and (3) adding zirconia into a third weight of water, adjusting a pH value thereof to 2.5-3 with nitric acid, and uniformly stirring; then adding a second dispersant and a viscosity modifier, uniformly stirring, and obtaining a film coating solution; coating the film coating solution on an outer layer of the cordierite support, drying and sintering the cordierite support, and obtaining the cordierite support with the outer layer coated by a zirconia film layer.

Preferably, in the step (1), a weight ratio of the ethyl alcohol and the water is 0.85-1.15:1; a median particle diameter D50 of the cordierite powders is 2-5 μm; and a weight of the cordierite powders is 25-35% of a total weight of the ethyl alcohol and the water.

Preferably, in the step (1), the first dispersant is a polyethylene glycol dispersant or a polyvinyl alcohol (PVA) dispersant, and a weight of the added first dispersant is 2-5% of the weight of the cordierite powders; for the polyethylene glycol dispersant, it is preferred to be polyethylene glycol 400 or polyethylene glycol 600, wherein a weight of the added polyethylene glycol 400 is 3.5-4% of the weight of the cordierite powders and a weight of the added polyethylene glycol 600 is 2.5-3% of the weight of the cordierite powders; for the PVA dispersant, it is preferred to be PVA088-20, and a weight thereof is 2-3% of the weight of the cordierite powders.

Preferably, in the step (1), a total weight of the tetraethoxysilane, the aluminum salt, the magnesium salt and the lanthanum salt is 3-8% of the weight of the cordierite powders; and a molar ratio of silicon in the tetraethoxysilane, aluminum in the aluminum salt, magnesium in the magnesium salt and lanthanum in the lanthanum salt is 5-5.2:4:2-2.2:0-3.

Preferably, in the step (1), the aluminum salt comprises at least one member selected from a group consisting of aluminum nitrate, aluminum chloride and aluminum sulfate, and the aluminum chloride is preferred; the magnesium salt comprises at least one member selected from a group consisting of magnesium nitrate, magnesium chloride and magnesium sulfate, and the magnesium chloride is preferred; the lanthanum salt comprises at least one member selected from a group consisting of lanthanum nitrate, lanthanum chloride and lanthanum sulfate, and the lanthanum chloride is preferred.

Preferably, in the step (1), a heating temperature is 450-650° C. and kept for 1-6 hours.

Preferably, in the step (2), the binder is methylcellulose or hydroxypropyl methyl cellulose, and a weight of the added binder is 4-10% of a weight of the cordierite particles; the second weight of water is 20-40% of the weight of the cordierite particles; the humectant is glycerinum, and a weight of the added humectant is 1.5-3.5% of the weight of the cordierite particles.

Preferably, in the step (2), the green body is a circular tubular green body having a single hole, three holes or four holes.

Preferably, in the step (2), a sintering temperature is 950-1150° C. and a sintering time is 1-6 hours.

Preferably, in the step (3), a median particle diameter D50 of the zirconia is 0.25-0.6 μm, and a weight of the added zirconia is 10-20% of the third weight of water in the film coating solution; the second dispersant is a polyethylene glycol dispersant, and a weight of the added second dispersant is 2-5% of the weight of the zirconia; the viscosity modifier is hydroxypropyl methyl cellulose, and a weight of the added viscosity modifier is 0.65-1.5% of the third weight of water in the film coating solution; and a weight of the film coating solution is 6-12% of a weight of the cordierite support.

Preferably, in the step (3), a sintering temperature is 950-1150° C. and a sintering time is 2-4 hours.

For the support of the molecular sieve membrane prepared through the present invention, a cordierite support layer, namely the cordierite support without the outer layer coated by the zirconia film layer, has a pore diameter of 0.6-1.5 µm, a porosity of 33-40%, and a thickness of 1-5 mm; and, the zirconia film layer has an average pore diameter of 0.08-0.4 µm, a porosity of 40-55% and a thickness of 3-30 µm.

According to the present invention, a surface of the cordierite powders is enveloped by a layer of nanometer oxides of magnesium, aluminum and silicon and nanometer oxides of lanthanum serving as the sintering aid, wherein the nanometer oxides of magnesium, aluminum and silicon has the same composition and proportion as the cordierite. The cordierite fine powders enveloped by the nanometer oxides, having the same composition as the cordierite, can be sintered at a relatively low temperature, and then the cordierite porous support having the pore diameter of about 1 µm is obtained.

Preferably, the method for preparing the support of the molecular sieve membrane comprises steps of:

(1) adding ethyl alcohol and a first weight of water into a reaction kettle with a weight ratio of 0.85-1.15:1, then adding cordierite powders, and uniformly stirring; adding a first dispersant, then adding tetraethoxysilane, aluminum salt, magnesium salt and lanthanum salt, stirring and dissolving, and obtaining a mixed liquid; increasing a temperature of the mixed liquid to 65-80° C., then adding ammonium hydroxide into the mixed liquid, and adjusting a pH value thereof to 5-6; reacting for 2-12 hours, and generating a mixed sol of silicon, aluminum, magnesium and lanthanum; further adjusting the pH value to 8-9, reacting for 2-6 hours, and aging the mixed sol; pouring an obtained mixture after reaction into a container, standing and generating precipitates; washing the precipitates with RO water, sucking and filtering liquid out, and drying the precipitates; heating the dried precipitates to 450-650° C., keeping for 1-6 hours, and obtaining cordierite particles enveloped by composite nanometer oxides;

(2) uniformly mixing and stirring the cordierite particles, a binder, a second weight of water, and a humectant, and forming mud; extruding the mud in an extruder with a mold, and forming the mud into a circular tubular green body having a single hole, three holes or four holes; drying the green body, keeping at 950-1150° C. for 1-6 hours, sintering, and obtaining a cordierite support; and (3) adding zirconia into a third weight of water, adjusting a pH value thereof to 2.5-3 with nitric acid, and uniformly stirring; adding a second dispersant and a viscosity modifier, uniformly stirring, and obtaining a film coating solution; coating the film coating solution on an outer layer of the cordierite support, drying the support, keeping at 950-1150° C. for 2-4 hours, sintering, and obtaining the cordierite support with the outer layer enveloped by a zirconia film layer.

Compared with prior arts, the present invention has following beneficial effects.

(1) The support provided by the present invention is a two-layer composite support. The zirconia film layer having the pore diameter of 0.08-0.4 µm is formed on the cordierite support layer, and the molecular sieve is synthesized and grows on the zirconia film layer. Compared with the conventional single-layer support having the average pore diameter of 1 µm, a base film layer, namely the zirconia film layer, of the support provided by the present invention, on which the molecular sieve grows, has the smaller and more uniform pore diameter and the higher porosity, so that the molecular sieve membrane growing on the zirconia film layer is more uniform, and has a shorter growth time and no defect.

(2) According to the present invention, the cordierite fine powders of 2-5 µm are enveloped by a layer of composite sol through a sol-gel method, wherein the composite sol has the same composition as the cordierite. Meanwhile, a sol of rare earth lanthanum serves as the solid sintering aid. The composite nanometer oxides formed through presintering the sols can be sintered at 950-1150° C. and form the cordierite, wherein the sintering temperature of 950-1150° C. is far lower than a melting temperature of the cordierite of 2-5 µm, so that the cordierite support, having the pore diameter of 0.6-1.5 µm and the three-point bending strength of 2000-2700 N, is obtained. The rare earth lanthanum further increases the sintering strength of the support. Conventionally, the mixed sintering methods are adopted, such as sintering the coarse powders of tens of nanometers with the fine powders of several nanometers, and sintering the coarse powders of tens to hundreds of nanometers with the other material having a low melting point. However, merely the macroporous support having the pore diameter of larger than 5-100 µm is able to be prepared through the mixed sintering methods. If the fine powders of 2-5 µm are directly sintered, because the melting temperature and the sintering temperature of the cordierite are nearly the same, merely the compact cordierite support is able to be obtained in the range of the sintering temperature. Thus, the obtained cordierite support through the prior arts is unable to serve as the support of the molecular sieve membrane, and the present invention solves the problem.

(3) According to the present invention, the cordierite powders are enveloped by the sol of lanthanum serving as the sintering aid, and no independent fine powder is required to be additionally added to serve as the sintering aid, which solves a porosity decrease problem of the support caused by the fine powders blocking the pore channel. Meanwhile, because of the nanometer powders formed through the sol-gel method, the sintering temperature is merely 950-1150° C., which is lower than a sintering temperature of the support made of the α-aluminum oxide or other material, so that a sintering cost and a furnace equipment investment cost are decreased.

(4) According to the present invention, the cordierite powders have a low price, which is far cheaper than the α-aluminum oxide and the stainless steel frequently used in the support of the molecular sieve.

BRIEF DESCRIPTION OF THE DRAWINGS

The drawing is a scanning electron microscope photo of a surface of a zirconia porous film layer according to a first preferred embodiment of the present invention.

DETAILED DESCRIPTION OF THE PREFERRED EMBODIMENT

The present invention is further described with the preferred embodiments.

First Preferred Embodiment (1) Adding cordierite powders having a median particle diameter D50 of 5 µm into a first mixed solution of ethyl alcohol and a first weight of reverse osmosis (RO) water, wherein a weight ratio of the ethyl alcohol and the RO water in the first mixed solution is 1:1, and a weight of the added cordierite powders is 35% of a weight of the first mixed solution; uniformly stirring, then adding polyethylene glycol 600 serving as a dispersant, continuing uniformly stirring, and obtaining a first intermediate, wherein a weight of the added polyethylene glycol 600 is 2% of the weight of the cordierite powders; increasing a temperature of the first intermediate to 75° C., then adding magnesium chloride, aluminum chloride, tetraethoxysilane and lanthanum nitrate with a molar ratio of 2.2:4:5:0.5, stirring for the magnesium chloride, the aluminum chloride, the tetraethoxysilane and the lanthanum nitrate being uniformly distributed, and obtaining a second intermediate, wherein a total weight of the magnesium chloride, the aluminum chloride, the tetraethoxysilane and the lanthanum nitrate is 8% of the weight of the cordierite powders; slowing spraying a first weight of ammonium hydroxide into the second intermediate until a pH value thereof is 5.5, continuously stirring and reacting for 3 hours, and generating a sol; continuing spraying a second weight of ammonium hydroxide until the pH value is 8.5, continuously stirring for 5 hours, and aging the sol; during the above process, keeping the temperature always at 75° C.; transferring an obtained mixture after reaction to a large container in a stirring state, standing, clarifying, and then sucking and filtering liquid out; adding a second weight of RO water and stirring, continuing clarifying, and then sucking and filtering the second weight of RO water out; scatteredly loading obtained precipitates into a box container, then sending the box container into a drying oven, increasing a temperature of the precipitates to 105° C. with a speed of 1° C./minute, and drying the precipitates for 20 hours; loading the dried precipitates into a furnace, increasing the temperature of the precipitates to 500° C. with a speed of 1° C./minute, and keeping the temperature for 2 hours; transforming the sol into nanoparticles, and the nanoparticles being firmly sintered on the cordierite powders;

(2) putting the cordierite powders enveloped by the nanoparticles into a kneading machine, then adding a first weight of hydroxypropyl methyl cellulose, and uniformly stirring the first weight of hydroxypropyl methyl cellulose and the cordierite powders enveloped by the nanoparticles, wherein the first weight of hydroxypropyl methyl cellulose is 10% of the weight of the cordierite powders; adding a second mixed solution in which glycerinum and a third weight of RO water are uniformly mixed into the kneading machine, and uniformly stirring, wherein a weight of the added glycerinum is 3.5% of the weight of the cordierite powders and the third weight of RO water is 40% of the weight of the cordierite powders; uniformly stirring and forming mud; pouring the mud into an extruder, starting an evacuating device, extruding the mud under vacuum, and forming the mud into a circular tubular green body having a single hole or four holes; sending the green body into the drying oven, increasing a temperature of the green body to 80° C. with a speed of 0.5° C./minute, keeping the temperature for 10 hours, and drying the green body; sending the dried green body into the furnace, increasing the temperature of the green body to 1150° C. with a speed of 0.5° C./minute, keeping the temperature for 4 hours, and obtaining a cordierite substrate, wherein it is tested that the cordierite substrate has an average pore diameter of 1.5 μm and a porosity of 33%; and a four-hole support with a diameter of 25 mm has a three-point bending strength of 2550 N; and (3) adding zirconia having a median particle diameter D50 of 0.35 μm into water, and uniformly stirring, wherein a weight of the zirconia is 20% of a weight of the water; adding polyethylene glycol 400 having a weight equal to 2% of the weight of the zirconia, and continuing uniformly stirring; adding a second weight of hydroxypropyl methyl cellulose, stirring, and totally dissolving the second weight of hydroxypropyl methyl cellulose, wherein the second weight of hydroxypropyl methyl cellulose is 1% of the weight of the water; evacuating, defoaming, and obtaining a zirconia dispersion liquid; closing pore channels at an end of the cordierite substrate, immersing the cordierite substrate into the zirconia dispersion liquid, standing for 50 seconds, adsorbing the zirconia dispersion liquid onto the cordierite substrate, and taking out the cordierite substrate absorbed with the zirconia dispersion liquid; vertically placing the cordierite substrate absorbed with the zirconia dispersion liquid in the drying oven of 100° C., and drying for 5 hours; sending the dried cordierite substrate into the furnace, increasing a temperature of the cordierite substrate to 1150° C. with a speed of 1° C./minute, keeping the temperature for 2 hours, and obtaining a cordierite molecular sieve support enveloped by a zirconia porous film layer, wherein: a pore diameter and a porosity of the zirconia porous film layer are showed in the drawing; the zirconia porous film layer has an average pore diameter of 0.11 μm, a largest pore diameter of 0.32 μm and a porosity of 48%; compared with the cordierite substrate, the zirconia porous film layer has the greatly optimized porosity and pore diameter; the drawing is shot by a Sirion 200 field emission scanning electron microscope (FESEM) with a magnification of 10,000; and, from the drawing, it is seen that the zirconia porous film layer has the high porosity and the pore diameter between 0.1 μm and 0.4 μm.

Second Preferred Embodiment (1) Adding cordierite powders having a median particle diameter D50 of 5 μm into a first mixed solution of ethyl alcohol and a first weight of RO water, wherein a weight ratio of the ethyl alcohol and the RO water in the first mixed solution is 1:1, and a weight of the added cordierite powders is 35% of a weight of the first mixed solution; uniformly stirring, then adding polyethylene glycol 600 serving as a dispersant, continuing uniformly stirring, and obtaining a first intermediate, wherein a weight of the added polyethylene glycol 600 is 2% of the weight of the cordierite powders; increasing a temperature of the first intermediate to 75° C., then adding magnesium chloride, aluminum chloride and tetraethoxysilane with a molar ratio of 2.2:4:5, stirring for the magnesium chloride, the aluminum chloride and the tetraethoxysilane being uniformly distributed, and obtaining a second intermediate, wherein a total weight of the magnesium chloride, the aluminum chloride and the tetraethoxysilane is 8% of the weight of the cordierite powders; slowing spraying a first weight of ammonium hydroxide into the second intermediate until a pH value thereof is 5.5, continuously stirring and reacting for 3 hours, and generating a sol; continuing spraying a second weight of ammonium hydroxide until the pH value is 8.5, continuously stirring for 5 hours, and aging the sol; during the above process, keeping the temperature always at 75° C.; transferring an obtained mixture after reaction to a large container in a stirring state, standing, clarifying, and then sucking and filtering liquid out; adding a second weight of RO water and stirring, continuing clarifying, and then sucking and filtering the second weight of RO water out; scatteredly loading obtained precipitates into a box container, then sending the box container into a drying oven, increasing a temperature of the precipitates to 105° C. with a speed of 1° C./minute, and drying the precipitates for 20 hours; loading the dried precipitates into a furnace, increasing the temperature of the precipitates to 500° C. with a speed of 1° C./minute, and keeping the temperature for 2 hours; transforming the sol into nanoparticles, and the nanoparticles being firmly sintered on the cordierite powders;

(2) putting the cordierite powders enveloped by the nanoparticles into a kneading machine, then adding a first weight of hydroxypropyl methyl cellulose, and uniformly stirring the first weight of hydroxypropyl methyl cellulose and the cordierite powders enveloped by the nanoparticles, wherein the first weight of hydroxypropyl methyl cellulose is 10% of the weight of the cordierite powders; adding a second mixed solution in which glycerinum and a third weight of RO water are uniformly mixed into the kneading machine, and uniformly stirring, wherein a weight of the added glycerinum is 3.5% of the weight of the cordierite powders and the third weight of RO water is 40% of the weight of the cordierite powders; uniformly stirring and forming mud; pouring the mud into an extruder, starting an evacuating device, extruding the mud under vacuum, and forming the mud into a circular tubular green body having a single hole or four holes; sending the green body into the drying oven, increasing a temperature of the green body to 80° C. with a speed of 0.5° C./minute, keeping the temperature for 10 hours, and drying the green body; sending the dried green body into the furnace, increasing the temperature of the green body to 1150° C. with a speed of 0.5° C./minute, keeping the temperature for 4 hours, and obtaining a cordierite substrate, wherein: it is tested that the cordierite substrate has an average pore diameter of 1.5 μm and a porosity of 33%; a four-hole support with a diameter of 25 mm has a three-point bending strength of 2050 N; and, on equal conditions, without adding lanthanum, a cordierite support has a decreased strength, but is still able to serve as a support of a molecular sieve; and (3) adding zirconia having a median particle diameter D50 of 0.35 μm into water, and uniformly stirring, wherein a weight of the zirconia is 20% of a weight of the water; adding polyethylene glycol 400 having a weight equal to 2% of the weight of the zirconia, and continuing uniformly stirring; adding a second weight of hydroxypropyl methyl cellulose, stirring, and totally dissolving the second weight of hydroxypropyl methyl cellulose, wherein the second weight of hydroxypropyl methyl cellulose is 1% of the weight of the water; evacuating, defoaming, and obtaining a zirconia dispersion liquid; closing pore channels at an end of the cordierite substrate, immersing the cordierite substrate into the zirconia dispersion liquid, standing for 50 seconds, adsorbing the zirconia dispersion liquid onto the cordierite substrate, and taking out the cordierite substrate adsorbed with the zirconia dispersion liquid; vertically placing the cordierite substrate adsorbed with the zirconia dispersion liquid in the drying oven of 100° C., and drying for 5 hours; sending the dried cordierite substrate into the furnace, increasing a temperature of the cordierite substrate to 1150° C. with a speed of 1° C./minute, keeping the temperature for 2 hours, and obtaining a cordierite molecular sieve support enveloped by a zirconia porous film layer, wherein: the zirconia porous film layer has an average pore diameter of 0.12 μm, a largest pore diameter of 0.33 μm and a porosity of 47.5%; and, compared with the cordierite substrate, the zirconia porous film layer has the greatly optimized porosity and pore diameter.

Third Preferred Embodiment (1) Adding cordierite powders having a median particle diameter D50 of 2 μm into a first mixed solution of ethyl alcohol and a first weight of RO water, wherein a weight ratio of the ethyl alcohol and the RO water in the first mixed solution is 1:1, and a weight of the added cordierite powders is 25% of a weight of the first mixed solution; uniformly stirring, then adding polyethylene glycol 600 serving as a dispersant, continuing uniformly stirring, and obtaining a first intermediate, wherein a weight of the addedpolyethylene glycol 600 is 5% of the weight of the cordierite powders; increasing a temperature of the first intermediate to 70° C., then adding magnesium chloride, aluminum chloride, tetraethoxysilane and lanthanum nitrate with a molar ratio of 2:4:5:1, stirring for the magnesium chloride, the aluminum chloride, the tetraethoxysilane and the lanthanum nitrate being uniformly distributed, and obtaining a second intermediate, wherein a total weight of the magnesium chloride, the aluminum chloride, the tetraethoxysilane and the lanthanum nitrate is 5% of the weight of the cordierite powders; slowing spraying a first weight of ammonium hydroxide into the second intermediate until a pH value thereof is 5.5, continuously stirring and reacting for 3 hours, and generating a sol; continuing spraying a second weight of ammonium hydroxide until the pH value is 9, continuously stirring for 5 hours, and aging the sol; during the above process, keeping the temperature always at 70° C.; transferring an obtained mixture after reaction to a large container in a stirring state, standing, clarifying, and then sucking and filtering liquid out; adding a second weight of RO water and stirring, continuing clarifying, and then sucking and filtering the second weight of RO water out; scatteredly loading obtained precipitates into a box container, then sending the box container into a drying oven, increasing a temperature of the precipitates to 105° C. with a speed of 1° C./minute, and drying the precipitates for 20 hours; loading the dried precipitates into a furnace, increasing the temperature of the precipitates to 450° C. with a speed of 1° C./minute, and keeping the temperature for 2 hours; transforming the sol into nanoparticles, and the nanoparticles being firmly sintered on the cordierite powders;

(2) putting the cordierite powders enveloped by the nanoparticles into a kneading machine, then adding a first weight of hydroxypropyl methyl cellulose, and uniformly stirring the first weight of hydroxypropyl methyl cellulose and the cordierite powders enveloped by the nanoparticles, wherein the first weight of hydroxypropyl methyl cellulose is 4% of the weight of the cordierite powders; adding a second mixed solution in which glycerinum and a third weight of RO water are uniformly mixed into the kneading machine, and uniformly stirring, wherein a weight of the added glycerinum is 2% of the weight of the cordierite powders and the third weight of RO water is 20% of the weight of the cordierite powders; uniformly stirring and forming mud; pouring the mud into an extruder, starting an evacuating device, extruding the mud under vacuum, and forming the mud into a circular tubular green body having a single hole or four holes; sending the green body into the drying oven, increasing a temperature of the green body to 80° C. with a speed of 0.5° C./minute, keeping the temperature for 10 hours, and drying the green body; sending the dried green body into the furnace, increasing the temperature of the green body to 1050° C. with a speed of 0.5° C./minute, keeping the temperature for 2 hours, and obtaining a cordierite substrate, wherein it is tested that the cordierite substrate has an average pore diameter of 0.8 μm and a porosity of 29%; and a four-hole support with a diameter of 25 mm has a three-point bending strength of 2450 N; and (3) adding zirconia having a median particle diameter D50 of 0.6 μm into water, and uniformly stirring, wherein a weight of the zirconia is 10% of a weight of the water; adding polyethylene glycol 400 having a weight equal to 3% of the weight of the zirconia, and continuing uniformly stirring; adding a second weight of hydroxypropyl methyl cellulose, stirring, and totally dissolving the second weight of hydroxypropyl methyl cellulose, wherein the second weight of hydroxypropyl methyl cellulose is 1% of the weight of the water; evacuating, defoaming, and obtaining a zirconia dispersion liquid; closing pore channels at an end of the cordierite substrate, immersing the cordierite substrate into the zirconia dispersion liquid, standing for 50 seconds, adsorbing the zirconia dispersion liquid onto the cordierite substrate, and taking out the cordierite substrate adsorbed with the zirconia dispersion liquid; vertically placing the cordierite substrate adsorbed with the zirconia dispersion liquid in the drying oven of 100° C., and drying for 5 hours; sending the dried cordierite substrate into the furnace, increasing a temperature of the cordierite substrate to 1150° C. with a speed of 1° C./minute, keeping the temperature for 2 hours, and obtaining a cordierite molecular sieve support enveloped by a zirconia porous film layer, wherein: the zirconia porous film layer has an average pore diameter of 0.36 μm, a largest pore diameter of 0.45 μm and a porosity of 44%; and the support has a three-point bending strength of 2450 N.

Fourth Preferred Embodiment (1) adding cordierite powders having a median particle diameter D50 of 4 μm into a first mixed solution of ethyl alcohol and a first weight of RO water, wherein a weight ratio of the ethyl alcohol and the RO water in the first mixed solution is 1:1, and a weight of the added cordierite powders is 30% of a weight of the first mixed solution; uniformly stirring, then adding polyethylene glycol 600 serving as a dispersant, continuing uniformly stirring, and obtaining a first intermediate, wherein a weight of the added polyethylene glycol 600 is 3% of the weight of the cordierite powders; increasing a temperature of the first intermediate to 65° C., then adding magnesium chloride, aluminum chloride, and tetraethoxysilane with a molar ratio of 2:4:5.5, stirring for the magnesium chloride, the aluminum chloride, and the tetraethoxysilane being uniformly distributed, and obtaining a second intermediate, wherein a total weight of the magnesium chloride, the aluminum chloride, and the tetraethoxysilane is 6% of the weight of the cordierite powders; slowing spraying a first weight of ammonium hydroxide into the second intermediate until a pH value thereof is 5.5, continuously stirring and reacting for 3 hours, and generating a sol; continuing spraying a second weight of ammonium hydroxide until the pH value is 8.5, continuously stirring for 5 hours, and aging the sol; during the above process, keeping the temperature always at 65° C.; transferring an obtained mixture after reaction to a large container in a stirring state, standing, clarifying, and then sucking and filtering liquid out; adding a second weight of RO water and stirring, continuing clarifying, and then sucking and filtering the second weight of RO water out; scatteredly loading obtained precipitates into a box container, then sending the box container into a drying oven, increasing a temperature of the precipitates to 105° C. with a speed of 1° C./minute, and drying the precipitates for 20 hours; loading the dried precipitates into a furnace, increasing the temperature of the precipitates to 450° C. with a speed of 1° C./minute, and keeping the temperature for 2 hours; transforming the sol into nanoparticles, and the nanoparticles being firmly sintered on the cordierite powders;

(2) putting the cordierite powders enveloped by the nanoparticles into a kneading machine, then adding a first weight of hydroxypropyl methyl cellulose, and uniformly stirring the first weight of hydroxypropyl methyl cellulose and the cordierite powders enveloped by the nanoparticles, wherein the first weight of hydroxypropyl methyl cellulose is 7% of the weight of the cordierite powders; adding a second mixed solution in which glycerinum and a third weight of RO water are uniformly mixed into the kneading machine, and uniformly stirring, wherein a weight of the added glycerinum is 3% of the weight of the cordierite powders and the third weight of RO water is 30% of the weight of the cordierite powders; uniformly stirring and forming mud; pouring the mud into an extruder, starting an evacuating device, extruding the mud under vacuum, and forming the mud into a circular tubular green body having a single hole or four holes; sending the green body into the drying oven, increasing a temperature of the green body to 80° C. with a speed of 0.5° C./minute, keeping the temperature for 10 hours, and drying the green body; sending the dried green body into the furnace, increasing the temperature of the green body to 950° C. with a speed of 0.5° C./minute, keeping the temperature for 2 hours, and obtaining a cordierite substrate, wherein it is tested that the cordierite substrate has an average pore diameter of 1.3 μm and a porosity of 31%; and a four-hole support with a diameter of 25 mm has a three-point bending strength of 2650 N; and (3) adding zirconia having a median particle diameter D50 of 0.25 μm into water, and uniformly stirring, wherein a weight of the zirconia is 15% of a weight of the water; adding polyethylene glycol 400 having a weight equal to 2.5% of the weight of the zirconia, and continuing uniformly stirring; adding a second weight of hydroxypropyl methyl cellulose, stirring, and totally dissolving the second weight of hydroxypropyl methyl cellulose, wherein the second weight of hydroxypropyl methyl cellulose is 0.65% of the weight of the water; evacuating, defoaming, and obtaining a zirconia dispersion liquid; closing pore channels at an end of the cordierite substrate, immersing the cordierite substrate into the zirconia dispersion liquid, standing for 50 seconds, adsorbing the zirconia dispersion liquid onto the cordierite substrate, and taking out the cordierite substrate adsorbed with the zirconia dispersion liquid; vertically placing the cordierite substrate adsorbed with the zirconia dispersion liquid in the drying oven of 100° C., and drying for 5 hours; sending the dried cordierite substrate into the furnace, increasing a temperature of the cordierite substrate to 1000° C. with a speed of 1° C./minute, keeping the temperature for 2 hours, and obtaining a cordierite molecular sieve support enveloped by a zirconia porous film layer, wherein: the zirconia porous film layer has an average pore diameter of 0.08 μm, a largest pore diameter of 0.15 μm and a porosity of 46%.

First Comparison

Pouring cordierite powders having a median particle diameter D50 of 5 μm into a kneading machine; adding ultrafine powders of silicon dioxide, magnesium carbonate and aluminum oxide into the kneading machine according to a molar ratio of silicon, magnesium and aluminum in cordierite, wherein a total weight of the three ultrafine powders is 15% of a weight of the cordierite powders; adding hydroxypropyl methyl cellulose having a weight equal to 10% of the weight of the cordierite powders, and uniformly stirring; then adding a mixed solution in which glycerinum and RO water are uniformly mixed, and uniformly stirring, wherein a weight of the added glycerinum is 3.5% of the weight of the cordierite powders and a weight of the RO water is 40% of the weight of the cordierite powders; uniformly stirring and forming mud; pouring the mud into an extruder, staring an evacuating device, extruding the mud under vacuum, and forming the mud into a circular tubular green body having a single hole or four holes; sending the green body into a drying oven, increasing a temperature of the green body to 80° C. with a speed of 0.5° C./minute, keeping the temperature for 10 hours, and drying the green body; sending the dried green body into a furnace, increasing the temperature of the green body to 1150° C. with a speed of 0.5° C./minute, keeping the temperature for 2 hours, and obtaining a cordierite substrate, wherein: it is tested that the cordierite substrate has an average pore diameter of 1.1 μm and a porosity of 11%; and a four-hole support with a diameter of 25 mm has a three-point bending strength of 470 N, which is unable to serve as a carrier of a molecular sieve membrane. If the green body is sintered to a temperature of 1350° C. with the same temperature increase speed and the temperature is kept for 2 hours, an obtained four-hole support with a diameter of 23 mm has a three-point bending strength of 2250 N and it is tested that the obtained four-hole support has a porosity of 5% and an average pore diameter of 2.9μm. Under the sintering temperature of 1350° C., although the support has the enough strength, the support has the low porosity and the large pore diameter, and is unable to serve as the support of the molecular sieve membrane.

Second Comparison

Pouring cordierite powders having a median particle diameter D50 of 5 μm into a kneading machine, then adding hydroxypropyl methyl cellulose having a weight equal to 10% of a weight of the cordierite powders, and uniformly stirring the cordierite powders and the hydroxypropyl methyl cellulose; adding a mixed solution in which glycerinum and RO water are uniformly mixed, and uniformly stirring, wherein a weight of the added glycerinum is 3.5% of the weight of the cordierite powders and a weight of the RO water is 40% of the weight of the cordierite powders; uniformly stirring and forming mud; pouring the mud into an extruder, staring an evacuating device, extruding the mud under vacuum, and forming the mud into a circular tubular green body having a single hole or four holes; sending the green body into a drying oven, increasing a temperature of the green body to 80° C. with a speed of 0.5° C./minute, keeping the temperature for 10 hours, and drying the green body; sending the dried green body into a furnace, increasing the temperature of the green body to 1150° C. with a speed of 0.5° C./minute, keeping the temperature for 2 hours, and obtaining a cordierite substrate, wherein: it is tested that the cordierite substrate has an average pore diameter of 1.3 μm and a porosity of 31%; and a four-hole support with a diameter of 25 mm has a three-point bending strength of 230 N, which is unable to serve as a carrier of a molecular sieve membrane. If the green body is sintered to a temperature of 1380° C. with the same temperature increase speed and the temperature is kept for 2 hours, an obtained four-hole support with a diameter of 23 mm has a three-point bending strength of 2450 N and it is tested that the four-hole support has a porosity of 4% and an average pore diameter of 4.8 μm. Under the sintering temperature of 1380° C., although the support has the enough strength, the support has the low porosity and the large pore diameter, and is unable to serve as the support of the molecular sieve membrane.

The above embodiments are merely the preferred embodiments of the present invention and not for limiting the implementing scope of the present invention. The equivalent changes and modifications based on the claims and the specification of the present invention are included in the protection scope of the present invention.

What is claimed is:

1. A method for preparing a support of a molecular sieve membrane, comprising steps of:
   (1) adding ethyl alcohol and a first weight of water into a reaction kettle, then adding cordierite powders, and uniformly stirring; adding a first dispersant, then adding tetraethoxysilane, aluminum salt, magnesium salt and lanthanum salt, stirring and dissolving, and obtaining a mixed liquid; increasing a temperature of the mixed liquid to 65-80° C., then adding ammonium hydroxide into the mixed liquid, and adjusting a pH value thereof to 5-6; reacting for 2-12 hours, and generating a mixed sol of silicon, aluminum, magnesium and lanthanum, wherein a proportion of silicon, aluminum and magnesium in the mixed sol is the same as that in a composition of cordierite; further adjusting the pH value to 8-9, reacting for 2-6 hours, and aging the mixed sol; pouring an obtained mixture into a container, standing and generating precipitates; washing the precipitates with reverse osmosis (RO) water, sucking and filtering liquid out, and drying the precipitates; heating the dried precipitates, keeping a temperature of the precipitates, and obtaining cordierite particles enveloped by composite nanometer oxides which are prepared according to a composition proportion of the cordierite;
   (2) uniformly mixing and stirring the cordierite particles, a binder, a second weight of water and a humectant, and forming mud; preparing the mud into a green body, drying the green body, and sintering the green body into a cordierite support; and
   (3) adding zirconia into a third weight of water, adjusting a pH value thereof to 2.5-3 with nitric acid, and uniformly stirring; then adding a second dispersant and a viscosity modifier, uniformly stirring, and obtaining a film coating solution; coating the film coating solution on an outer layer of the cordierite support, drying and sintering the cordierite support, and obtaining the cordierite support with the outer layer coated by a zirconia film layer.

2. The method for preparing the support of the molecular sieve membrane, as recited in claim 1, wherein: in the step (1), a weight ratio of the ethyl alcohol and the water is 0.85-1.15:1; a median particle diameter D50 of the cordierite powders is 2-5 μm, and a weight of the cordierite powders is 25-35% of a total weight of the ethyl alcohol and the water; the first dispersant is a polyethylene glycol dispersant or a polyvinyl alcohol (PVA) dispersant, and a weight of the added first dispersant is 2-5% of the weight of the cordierite powders.

3. The method for preparing the support of the molecular sieve membrane, as recited in claim 1, wherein: in the step (1), a total weight of the tetraethoxysilane, the aluminum salt, the magnesium salt and the lanthanum salt is 3-8% of a weight of the cordierite powders; and a molar ratio of silicon in the tetraethoxysilane, aluminum in the aluminum salt, magnesium in the magnesium salt and lanthanum in the lanthanum salt is 5-5.2:4:2-2.2:0-3.

4. The method for preparing the support of the molecular sieve membrane, as recited in claim 1, wherein: in the step (1), the aluminum salt comprises at least one member selected from a group consisting of aluminum nitrate, aluminum chloride and aluminum sulfate; the magnesium salt comprises at least one member selected from a group consisting of magnesium nitrate, magnesium chloride and magnesium sulfate; and the lanthanum salt comprises at least one member selected from a group consisting of lanthanum nitrate, lanthanum chloride and lanthanum sulfate.

5. The method for preparing the support of the molecular sieve membrane, as recited in claim 1, wherein: in the step (1), a heating temperature is 450-650° C. and kept for 1-6 hours.

6. The method for preparing the support of the molecular sieve membrane, as recited in claim 1, wherein: in the step (2), the binder is methylcellulose or hydroxypropyl methyl cellulose, and a weight of the added binder is 4-10% of a weight of the cordierite particles; the second weight of the water is 20-40% of the weight of the cordierite particles; the humectant is glycerinum, and a weight of the added humectant is 1.5-3.5% of the weight of the cordierite particles.

7. The method for preparing the support of the molecular sieve membrane, as recited in claim 1, wherein: in the step (2), the green body is a circular tubular green body having a single hole, three holes or four holes.

8. The method for preparing the support of the molecular sieve membrane, as recited in claim 1, wherein: in the step (2), a sintering temperature is 950-1150° C. and a sintering time is 1-6 hours.

9. The method for preparing the support of the molecular sieve membrane, as recited in claim 1, wherein: in the step (3), a median particle diameter D50 of the zirconia is 0.25-0.6 μm, and a weight of the added zirconia is 10-20% of the third weight of water in the film coating solution; the second dispersant is a polyethylene glycol dispersant, and a weight of the added second dispersant is 2-5% of the weight of the zirconia; the viscosity modifier is hydroxypropyl methyl cellulose, and a weight of the added viscosity modifier is 0.65-1.5% of the third weight of water in the film coating solution; and a weight of the film coating solution is 6-12% of a weight of the cordierite support.

10. The method for preparing the support of the molecular sieve membrane, as recited in claim 1, wherein: in the step (3), a sintering temperature is 950-1150° C. and a sintering time is 2-4 hours.

* * * * *